US007693551B2

(12) United States Patent
Ojard

(10) Patent No.: US 7,693,551 B2
(45) Date of Patent: Apr. 6, 2010

(54) DERIVATION OF BEAMFORMING COEFFICIENTS AND APPLICATIONS THEREOF

(75) Inventor: Eric J. Ojard, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 980 days.

(21) Appl. No.: 11/433,329

(22) Filed: May 12, 2006

(65) Prior Publication Data

US 2007/0015543 A1 Jan. 18, 2007

Related U.S. Application Data

(60) Provisional application No. 60/699,204, filed on Jul. 14, 2005.

(51) Int. Cl.
*H04M 1/00* (2006.01)

(52) U.S. Cl. ................ 455/562.1; 455/63.4; 455/193.1; 455/13.3; 375/260; 375/267; 375/262; 375/259

(58) Field of Classification Search ................. 455/562, 455/562.1, 63.4, 193.1, 13.3; 375/260, 262, 375/267, 299, 257, 259
See application file for complete search history.

(56) References Cited

U.S. PATENT DOCUMENTS

| | | | | |
|---|---|---|---|---|
| 2005/0265275 | A1 * | 12/2005 | Howard et al. | 370/328 |
| 2006/0120469 | A1 * | 6/2006 | Maltsev et al. | 375/260 |

OTHER PUBLICATIONS

Schreiner,Clint-Red River Engineering; "Utilizing Digital Downconverters for Efficient Digital Beamforming"; (5 page).

Choi, et al; "Interpolation Based Transmit Beamforming for MIMO-OFDM with Partial Feedback"; The University of Texas at Austin-Dept. of Electrical & Computer Engineering-Wireless Networking & Communications Group:Sep. 16, 2003:(15 pages).

Steyskal,Hans; "Digital Beamforming Basics (Antennas)";Journal of Electronic Defense; Jul. 1, 1996; (7 pages).

* cited by examiner

*Primary Examiner*—Vincent P Harper
*Assistant Examiner*—Fred A Casca
(74) *Attorney, Agent, or Firm*—Garlick Harrison & Markison

(57) ABSTRACT

A method for determining beamforming coefficients begins by obtaining channel information for a multiple tone communication. The method then continues by deriving the beamforming coefficients based on the channel information and a smoothness criteria.

6 Claims, 7 Drawing Sheets

DERIVATION OF BEAMFORMING COEFFICIENTS AND APPLICATIONS THEREOF

CROSS REFERENCE TO RELATED PATENTS

This patent application is claiming priority under 35 USC §119 to a provisionally filed patent application entitled UNIFORM PRECODING OF MIMO CHANNELS, having a provisional filing date of Jul. 14, 2005, and a provisional Ser. No. 60/699,204.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to wireless communication systems and more particularly to wireless communications using beamforming.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

In many systems, the transmitter will include one antenna for transmitting the RF signals, which are received by a single antenna, or multiple antennas, of a receiver. When the receiver includes two or more antennas, the receiver will select one of them to receive the incoming RF signals. In this instance, the wireless communication between the transmitter and receiver is a single-output-single-input (SISO) communication, even if the receiver includes multiple antennas that are used as diversity antennas (i.e., selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennas and two or more receiver paths. Each of the antennas receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennas to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

To further improve MIMO wireless communications where the number of transmit antennas exceeds the number of receiver antennas, transceivers may incorporate beamforming. In general, beamforming is a processing technique to create a focused antenna beam by shifting a signal in time or in phase to provide gain of the signal in a desired direction and to attenuate the signal in other directions. Prior art papers (1) Digital beamforming basics (antennas) by Steyskal, Hans, Journal of Electronic Defense, Jul. 1, 1996; (2) Utilizing Digital Downconverters for Efficient Digital Beamforming, by Clint Schreiner, Red River Engineering, no publication date; and (3) Interpolation Based Transmit Beamforming for MIMO-OFMD with Partial Feedback, by Jihoon Choi and Robert W. Heath, University of Texas, Department of Electrical and Computer Engineering, Wireless Networking and Communications Group, Sep. 13, 2003 discuss beamforming concepts.

As an example, in a 4×2 MIMO wireless communication, y=Hx+n and x=Wu, where W corresponds to the beamforming matrix, y corresponds to the received signal, H corresponds to the channel, u corresponds to the input signals, and x corresponds to the radio frequency (RF) transmit signals. Based on this:

$$\begin{bmatrix} y_1 \\ y_2 \end{bmatrix} = \begin{bmatrix} h_{11} & h_{12} & h_{13} & h_{14} \\ h_{21} & h_{22} & h_{23} & h_{24} \end{bmatrix} \begin{bmatrix} x_1 \\ x_2 \\ x_3 \\ x_4 \end{bmatrix} + \begin{bmatrix} n_1 \\ n_2 \end{bmatrix}$$

$$\begin{bmatrix} x_1 \\ x_2 \\ x_3 \\ x_4 \end{bmatrix} = \begin{bmatrix} w_{11} & w_{12} \\ w_{21} & w_{22} \\ w_{31} & w_{32} \\ w_{41} & w_{42} \end{bmatrix} \begin{bmatrix} u_1 \\ u_2 \end{bmatrix}$$

In order for a transmitter to properly implement beamforming (i.e., determine the beamforming matrix), it needs to know properties of the channel over which the wireless communication is conveyed. Accordingly, the receiver must provide feedback information for the transmitter to determine the properties of the channel. One approach for sending feedback from the receiver to the transmitter is for the receiver to determine the channel response (H) and to provide it as the feedback information. An issue with this approach is the size of the feedback packet, which may be so large that, during the time it takes to send it to the transmitter, the response of the channel has changed.

To reduce the size of the feedback, the receiver may decompose the channel using singular value decomposition (SVD) and send information relating only to a calculated value of the transmitter's beamforming matrix (V) as the feedback information. In this approach, the receiver calculates (V) based on:

$$H = UDV*, \quad W = VI_0, \quad \text{and } I_0 = \begin{bmatrix} I \\ 0 \end{bmatrix}$$

where H is the channel response, D is a diagonal matrix, and U is a receiver unitary matrix. For example, in a 4×2 MIMO communication, $$\begin{bmatrix} h_{11} & h_{12} & h_{13} & h_{14} \\ h_{21} & h_{22} & h_{23} & h_{24} \end{bmatrix} = \begin{bmatrix} u_{11} & u_{12} \\ u_{21} & u_{22} \end{bmatrix} \begin{bmatrix} s_1 & 0 & 0 & 0 \\ 0 & s_2 & 0 & 0 \end{bmatrix} \begin{bmatrix} v_{11} & v_{12} & v_{13} & v_{14} \\ v_{21} & v_{22} & v_{23} & v_{24} \\ v_{31} & v_{32} & v_{33} & v_{34} \\ v_{41} & v_{42} & v_{43} & v_{44} \end{bmatrix}^H$$

$$W = \begin{bmatrix} v_{11} & v_{12} \\ v_{21} & v_{22} \\ v_{31} & v_{32} \\ v_{41} & v_{42} \end{bmatrix}$$

While SVD provides a beamforming approach, it can reduce the combined channels' coherence bandwidth as seen by the receiver, which is problematic for some applications. In addition, the SVD beamforming approach can reduce the distance between codewords at the receiver, which hurts performance for near-ML receivers.

Another know beamforming approach is minimum mean-square error (MMSE), which based on the equation $$W=H^H(HH^H+\alpha I)^{-1}$$

While the MMSE beamforming approach reduces the coherence bandwidth of the combined channel, it increases the spatial peak-to-average ratio (e.g. the ratio of the power on the antenna with the highest transmitted power to the average power across all antennas) and the matrix inversion introduces a fundamental performance penalty, regardless of coding or receiver architectures. In addition, MMSE can reduce the distance between codewords at the receiver.

Therefore, a need exists for a method and apparatus for determining beamforming coefficients for wireless communications with negligible adverse affects as produced by the limitations of SVD and/or MMSE beamforming approaches.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
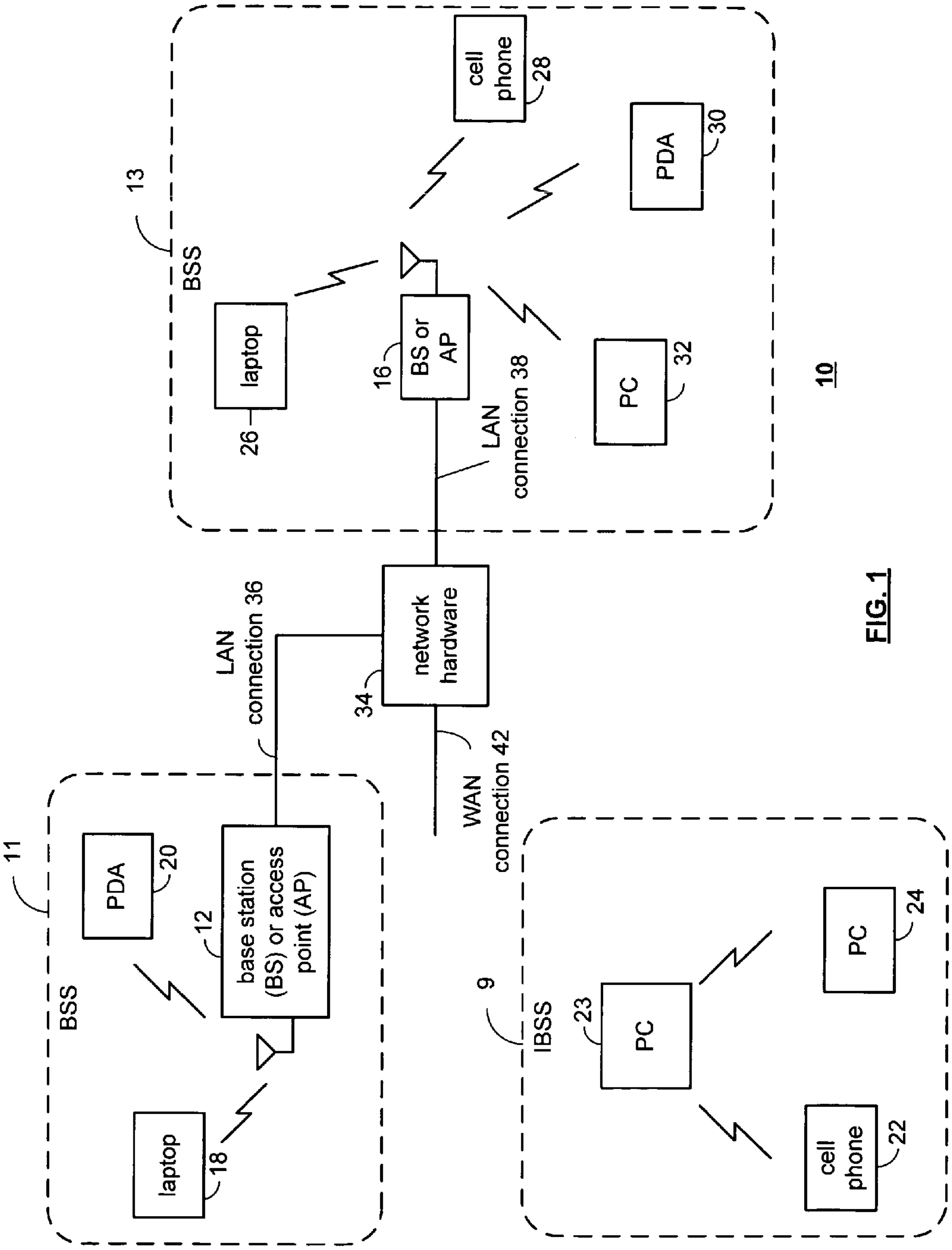
FIG. 1 is a schematic block diagram of a wireless communication system in accordance with the present invention.

FIG. 1 is a schematic block diagram illustrating a communication system 10 that includes a plurality of base stations and/or access points 12, 16, a plurality of wireless communication devices 18-32 and a network hardware component 34. Note that the network hardware 34, which may be a router, switch, bridge, modem, system controller, et cetera provides a wide area network connection 42 for the communication system 10. Further note that the wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12 16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Typically, base stations are used for cellular telephone systems and like-type systems, while access points are used for in-home or in-building wireless networks (e.g., IEEE 802.11 and versions thereof, Bluetooth, and/or any other type of radio frequency based network protocol). Regardless of the particular type of communication system, each wireless communication device includes a built-in radio and/or is coupled to a radio.

Figure 2:
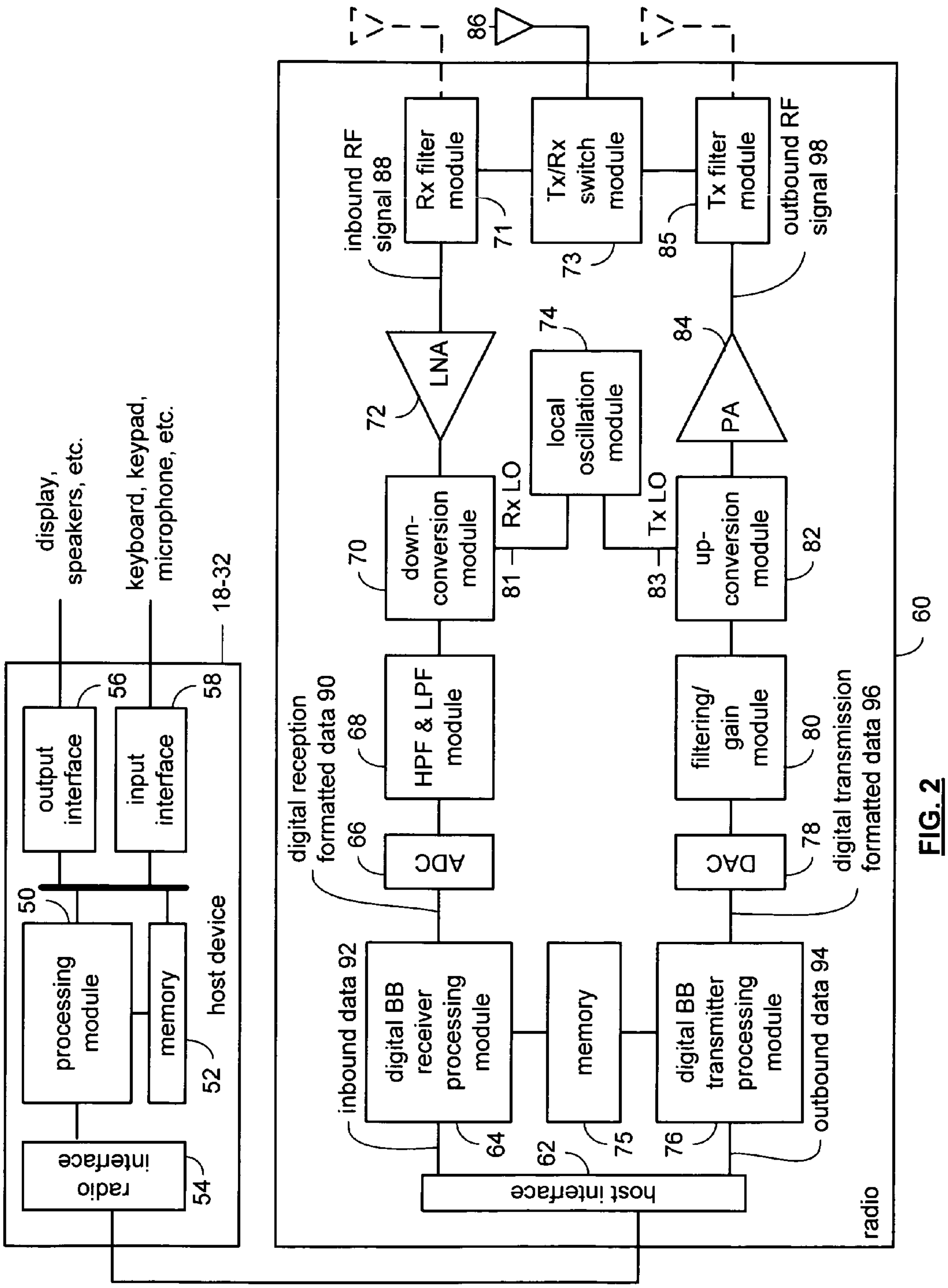
FIG. 2 is a schematic block diagram of a wireless communication device in accordance with the present invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, a radio interface 54, an input interface 58, and an output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a high pass and low pass filter module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter 78, a filtering/gain module 80, an IF mixing up conversion stage 82, a power amplifier 84, a transmitter filter module 85, and an antenna 86. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11, Bluetooth, et cetera) to produce outbound baseband signals 96. The outbound baseband signals 96 will be digital base-band signals (e.g., have a zero IF) or a digital low IF signals, where the low IF typically will be in the frequency range of one hundred kilohertz to a few megahertz.

The digital-to-analog converter 78 converts the outbound baseband signals 96 from the digital domain to the analog domain. The filtering/gain module 80 filters and/or adjusts the gain of the analog signals prior to providing it to the IF mixing stage 82. The IF mixing stage 82 converts the analog baseband or low IF signals into RF signals based on a transmitter local oscillation 83 provided by local oscillation module 74. The power amplifier 84 amplifies the RF signals to produce outbound RF signals 98, which are filtered by the transmitter filter module 85. The antenna 86 transmits the outbound RF signals 98 to a targeted device such as a base station, an access point and/or another wireless communication device.

The radio 60 also receives inbound RF signals 88 via the antenna 86, which were transmitted by a base station, an access point, or another wireless communication device. The antenna 86 provides the inbound RF signals 88 to the receiver filter module 71 via the Tx/Rx switch 73, where the Rx filter 71 bandpass filters the inbound RF signals 88. The Rx filter 71 provides the filtered RF signals to low noise amplifier 72, which amplifies the signals 88 to produce an amplified inbound RF signals. The low noise amplifier 72 provides the amplified inbound RF signals to the IF mixing module 70, which directly converts the amplified inbound RF signals into an inbound low IF signals or baseband signals based on a receiver local oscillation 81 provided by local oscillation module 74. The down conversion module 70 provides the inbound low IF signals or baseband signals to the filtering/gain module 68. The high pass and low pass filter module 68 filters the inbound low IF signals or the inbound baseband signals to produce filtered inbound signals.

The analog-to-digital converter 66 converts the filtered inbound signals from the analog domain to the digital domain to produce inbound baseband signals 90, where the inbound baseband signals 90 will be digital base-band signals or digital low IF signals, where the low IF typically will be in the frequency range of one hundred kilohertz to a few megahertz. The digital receiver processing module 64 decodes, descrambles, demaps, and/or demodulates the inbound baseband signals 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
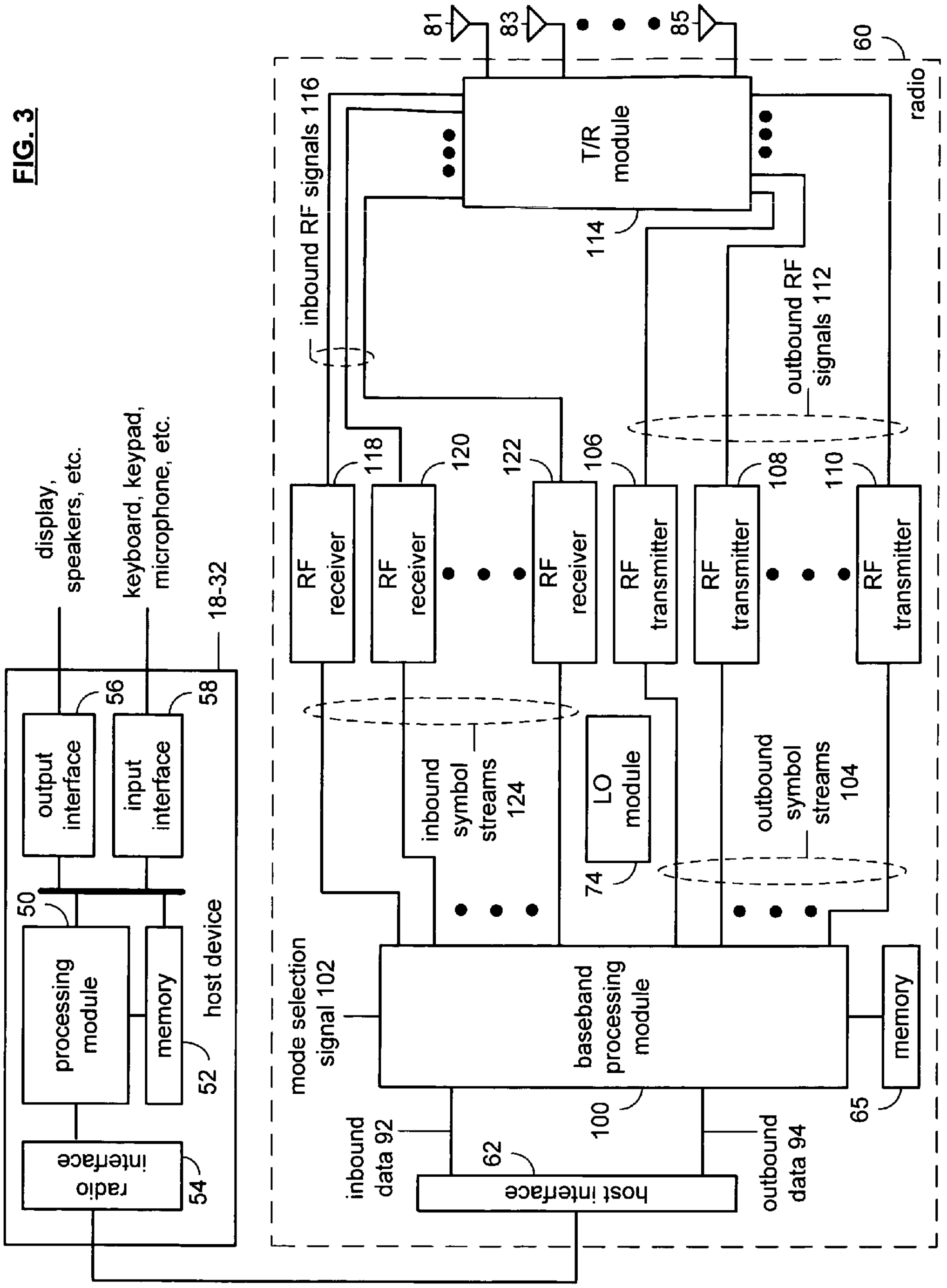
FIG. 3 is a schematic block diagram of another wireless communication device in accordance with the present invention.

FIG. 3 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, memory 65, a plurality of radio frequency (RF) transmitters 106-110, a transmit/receive (T/R) module 114, a plurality of antennas 81-85, a plurality of RF receivers 118-120, and a local oscillation module 74. The baseband processing module 100, in combination with operational instructions stored in memory 65, executes digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion. The baseband processing modules 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 64 receives the outbound data 88 and, based on a mode selection signal 102, produces one or more outbound symbol streams 90. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. The mode select signal 102 may also include a code rate, a number of coded bits per subcarrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode select signal 102 may further indicate a power spectral density mask value and a number of antennas to be initially used for a MIMO communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode select signal 102 indicates 2, 3 or 4 antennas, the baseband processing module 100 will produce 2, 3 or 4 outbound symbol streams 104 from the outbound data 94.

Depending on the number of outbound streams 104 produced by the baseband module 10, a corresponding number of the RF transmitters 106-110 will be enabled to convert the outbound symbol streams 104 into outbound RF signals 112. In general, each of the RF transmitters 106-110 includes a digital filter and upsampling module, a digital to analog conversion module, an analog filter module, a frequency up conversion module, a power amplifier, and a radio frequency bandpass filter. The RF transmitters 106-110 provide the outbound RF signals 112 to the transmit/receive module 114, which provides each outbound RF signal to a corresponding antenna 81-85.

When the radio 60 is in the receive mode, the transmit/receive module 114 receives one or more inbound RF signals 116 via the antennas 81-85 and provides them to one or more RF receivers 118-122. The RF receiver 118-122 converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of average skill in the art will appreciate, the wireless communication device of FIG. 3 may be implemented using one or more integrated circuits. For example, the host device may be implemented on one integrated circuit, the baseband processing module 100 and memory 65 may be implemented on a second integrated circuit, and the remaining components of the radio 60, less the antennas 81-85, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

Figure 4:
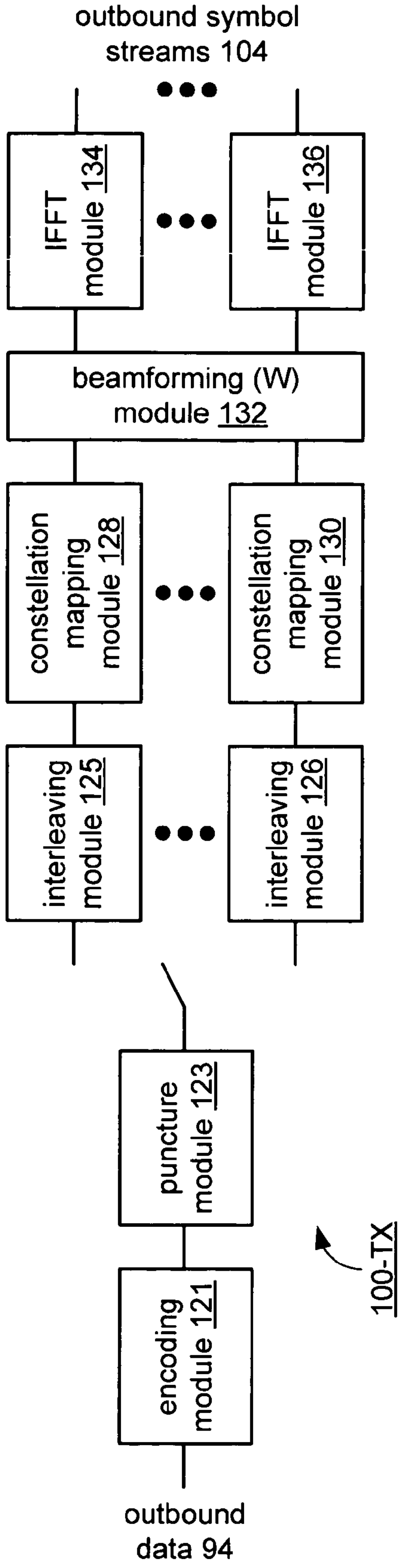
FIG. 4 is a schematic block diagram of baseband transmit processing in accordance with the present invention.

FIG. 4 is a schematic block diagram of baseband transmit processing 100-TX within the baseband processing module 100, which includes an encoding module 121, a puncture module 123, a switch, a plurality of interleaving modules 125, 126, a plurality of constellation encoding modules 128, 130, a beamforming module (W) 132, and a plurality of inverse fast Fourier transform (IFFT) modules 134, 136 for converting the outbound data 94 into the outbound symbol stream 104. As one of ordinary skill in the art will appreciate, the baseband transmit processing may include two or more of each of the interleaving modules 125, 126, the constellation mapping modules 128, 130, and the IFFT modules 134, 136. In addition, one of ordinary skill in art will further appreciate that the encoding module 121, puncture module 123, the interleaving modules 124, 126, the constellation mapping modules 128, 130, and the IFFT modules 134, 136 may be function in accordance with one or more wireless communication standards including, but not limited to, IEEE 802.11a, b, g, n.

In one embodiment, the encoding module 121 is operably coupled to convert outbound data 94 into encoded data in accordance with one or more wireless communication standards. The puncture module 123 punctures the encoded data to produce punctured encoded data. The plurality of interleaving modules 125, 126 is operably coupled to interleave the punctured encoded data into a plurality of interleaved streams of data. The plurality of constellation mapping modules 128, 130 is operably coupled to map the plurality of interleaved streams of data into a plurality of streams of data symbols.

In one embodiment, the constellation mapping modules 128, 130 function in accordance with one of the IEEE 802.11x standards to provide an OFDM (Orthogonal Frequency Domain Multiplexing) frequency domain baseband signals that includes a plurality of tones, or subcarriers, for carrying data. Each of the data carrying tones represents a symbol mapped to a point on a modulation dependent constellation map. For instance, a 16 QAM (Quadrature Amplitude Modulation) includes 16 constellation points, each corresponding to a different symbol.

The beamforming module 132 is operably coupled to beamform the plurality of streams of data symbols into a plurality of streams of beamformed symbols. The plurality of IFFT modules 134, 136 is operably coupled to convert the plurality of streams of beamformed symbols into a plurality of outbound symbol streams. The beamforming module 132 is operably coupled to multiply a beamforming unitary matrix (W) with baseband signals provided by the plurality of constellation mapping modules 128, 130.

In one embodiment and as will be described in greater detail with reference to FIGS. 6-8, the beamforming matrix may be determined based on: $W=H^H(HH^H)^{(-1/2)}$, wherein H is the channel matrix and $H^H$ is the transpose of the channel matrix. With such a matrix, the beamforming module may determine the coefficients and substantially avoids the limitations mentioned in the background section, with a negligible decrease in the combined channel's delay spread, provide the same SPAR as SVD beamforming, can be calculated using SVD, has a Unitary beamforming matrix of WH W=I, which can be computed directly using the above equation, or using SVD as follows.

| mode | Rx Combiner/ Equalizer (zero-forcing) | Channel | Tx Beamformer | Product |
|---|---|---|---|---|
| Omni (no BF)* | $I_0^H$ V S+ $U^H$ | U S $V^H$ | $I_0$ | I |
| SVD (prior art) | $I_0^H$ S+ $U^H$ | U S $V^H$ | V $I_0$ | I |
| MMSE(prior art) (alpha = 0) | I | U S $V^H$ | V S+ $U^H$ | I |
| Method 1 of present inv. | U $I_0^H$ S+ $U^H$ | U S $V^H$ | V $I_0$ $U^H$ | I |

*for adaptive antenna selection, assume the columns of H are ordered such that the columns comprising the highest-capacity submatrix are to the left.

As such, H=USV$^H$, where S+ is the pseudo-inverse of S. In this case S+=SH (S SH)−1 such that $$I_0 = \begin{bmatrix} I \\ 0 \end{bmatrix}$$

In another embodiment and as will be described in greater detail with reference to FIGS. 6-9, the beamforming module 132 may determine the beamforming coefficients by letting QR=H$^H$, where Q is unitary matrix and R is a triangular matrix. Then let W=Q$I_0$. To reduce the RMS delay spread, the QR decomposition should be performed such that the diagonal of R has constant phase (for example, real-valued). In general, QR decomposition is well-understood, computationally inexpensive, and provides similar behavior to the preceding embodiment. In this embodiment, the combined channel has a slightly larger RMS delay spread but it is still less than that of the original channel and has a slightly larger gap between strongest and weakest streams.

With respect to the embodiments of the beamforming module 132, the follow is a series of observations. Regarding smoothness, a small charge in H of SVD beamforming can produce a large change in V, which can dramatically increase the combined channel's delay spread (equivalently, it reduces the combined channel's coherence bandwidth). This is true even if the main diagonal of (US) is forced to be real. The large change in V is offset by a corresponding large change in U in the first embodiment and tends to reduce the combined channel's delay spread. The second embodiment (e.g., the QR beamforming) also reduces the combined channel's delay spread. SVD, SUBF, and QR have identical spatial PAR distributions, while spatial PAR distribution of MMSE is much worse.

The beamforming module 132 enables received constellation's minimum distance to be upper-bounded by the norm of each column of the product HW. In addition, when the beamforming module uses SVD Beamforming, W is chosen to minimize the norm of the right-most column of HW, thereby minimizing the bound on the minimum distance. Further, when the beamforming module 132 uses Smooth Unitary Beamforming, the columns (streams) are equally strong on average.

Figure 5:
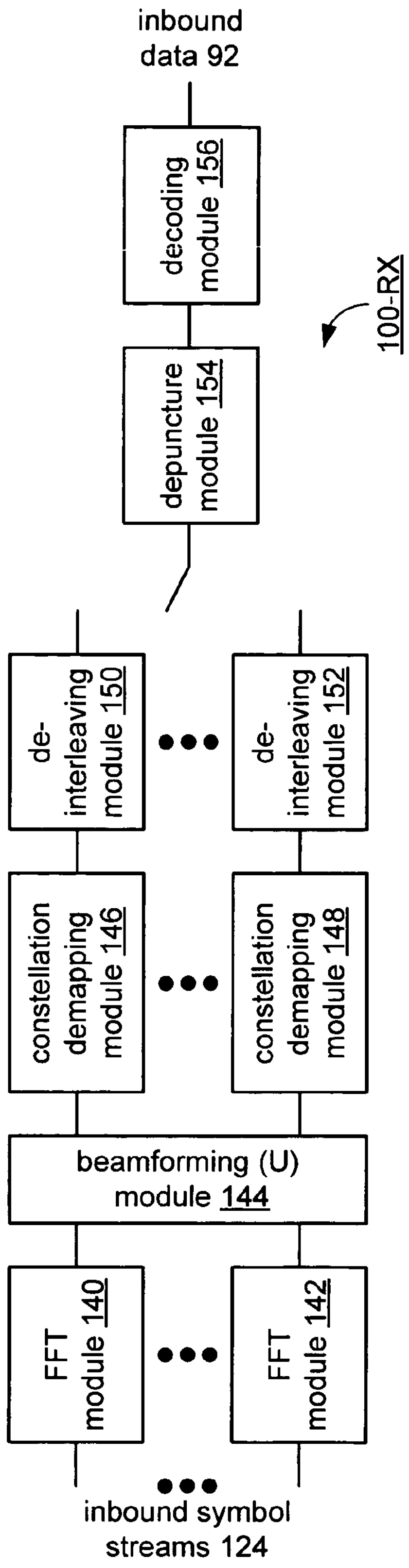
FIG. 5 is a schematic block diagram of baseband receive processing in accordance with the present invention.

FIG. 5 is a schematic block diagram of baseband receive processing 100-RX that includes a plurality of fast Fourier transform (FFT) modules 140, 142, a beamforming (U) module 144, a plurality of constellation demapping modules 146, 148, a plurality of deinterleaving modules 150, 152, a switch, a depuncture module 154, and a decoding module 156 for converting a plurality of inbound symbol streams 124 into inbound data 92. As one of ordinary skill in the art will appreciate, the baseband receive processing 100-RX may include two or more of each of the deinterleaving modules 150, 152, the constellation demapping modules 146, 148, and the FFT modules 140, 142. In addition, one of ordinary skill in art will further appreciate that the decoding module 156, depuncture module 154, the deinterleaving modules 150, 152, the constellation decoding modules 146, 148, and the FFT modules 140, 142 may be function in accordance with one or more wireless communication standards including, but not limited to, IEEE 802.11a, b, g, n.

In one embodiment, a plurality of FFT modules 140, 142 is operably coupled to convert a plurality of inbound symbol streams 124 into a plurality of streams of beamformed symbols. The inverse beamforming module 144 is operably coupled to inverse beamform (i.e., undue the beamforming of the transmitter) the plurality of streams of beamformed symbols into a plurality of streams of data symbols. The plurality of constellation demapping modules is operably coupled to demap the plurality of streams of data symbols into a plurality of interleaved streams of data. The plurality of deinterleaving modules is operably coupled to deinterleave the plurality of interleaved streams of data into encoded data. The decoding module is operably coupled to convert the encoded data into inbound data 92.

As one of ordinary skill in the art will appreciate, there are a number of receiver types that may be used to implement the receiver of FIG. 5. For example, a Linear Equalizer (LE) receiver, which has low complexity and low performance, may be used. As another example, a Maximum Likelihood (ML) equalizer/demapper, which is several dB better than LE, but not optimal, can be approximated by sphere decoding. As yet another example, a Full ML Receiver may be used, which is an optimal design choice in some applications and can be approximated by iterative demapping/decoding schemes.

Figure 6:
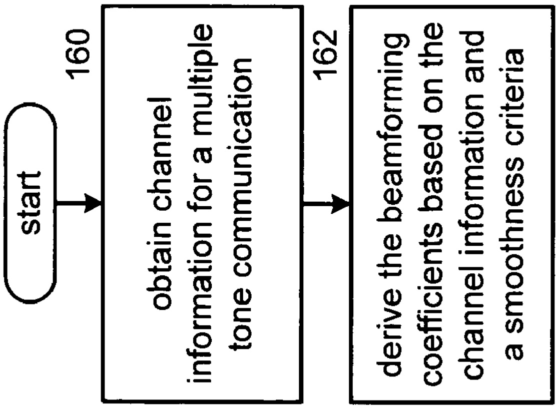
FIG. 6 is a logic diagram of a beamforming in accordance with the present invention.

FIG. 6 is a logic diagram of a beamforming that begins at step 160 where channel information for a multiple tone communication (e.g., OFDM MIMO wireless communication) is obtained. This may be done in a variety of ways, for example by using SVD. The method then proceeds to step 162 where the beamforming coefficients are derived based on the channel information and a smoothness criteria. This may be done in a variety of ways. For example, the beamforming coefficients may be derived based on unitary matrix criteria. As a more specific example, the unitary matrix criteria includes a transmit matrix (W) multiplied by a transpose of the transmit matrix (W$^H$) equals an identity matrix (I), wherein the transmit matrix (W) provides the beamforming coefficients.

As another example, the beamforming coefficients may be derived based on beamforming criteria. As a more specific example, the beamforming criteria maximizing a Forbenious norm of a product HW, where H is a channel matrix and W is a transmit matrix.

As yet another example, the smoothness criteria includes establishing a transmit matrix (W) based on a channel matrix (H) such that a combined matrix of HW has decreased sensitivity to changes in H, wherein the channel matrix (H) provides the channel information and the transmit matrix (W) provides the beamforming coefficients.

As a further example, a channel matrix (H) is obtained as the channel information and transposed to produce a transpose of the channel matrix (H$^H$). A transmit matrix (W) as the beamforming coefficients is then generated based on $W=H^H(H^HH)^{-1/2}$), wherein the transmit matrix (W) provides the beamforming coefficients.

As an even further example, a channel matrix (H) is obtained as the channel information, which is represented as a product of a first unitary matrix (U), a transpose of a second unitary matrix ($V^H$), and a diagonal matrix (S). This example continues by representing a transmit matrix (W) as a product of the second unitary matrix (V), a transpose of the first unitary matrix ($U^H$), and a representative identity matrix ($I_0$), wherein the transmit matrix (W) provides the beamforming coefficients. This example may further include determining the representative identity matrix ($I_0$) based on a number of transmit antennas and a number of receive antennas.

As a still further example, a channel matrix (H) is obtained as the channel information. The example continues by QR decomposing the channel matrix (H) such that $QR=H^H$, wherein $H^H$ represents a transpose of the channel matrix (H) and a diagonal of R has a constant phase. The example continues by establishing a transmit matrix (W) as a product of Q and a representative identity matrix (10), wherein the transmit matrix (W) provides the beamforming coefficients.

Figure 7:
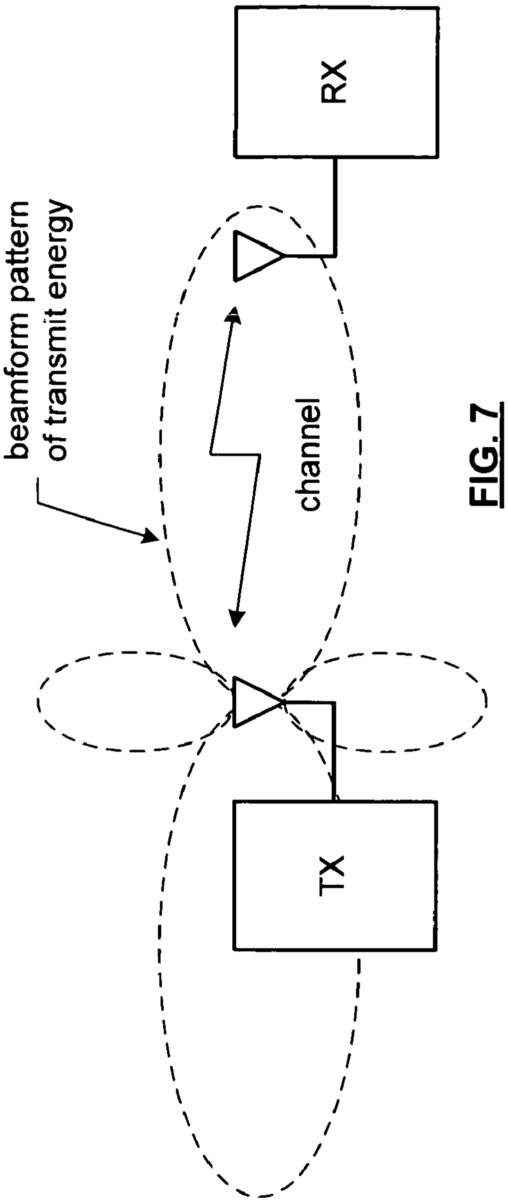
FIG. 7 is a schematic block diagram of a wireless communication with beamforming in accordance with the present invention.

FIG. 7 is a schematic block diagram of a wireless communication with beamforming between a transmitter (TX) and a receiver (RX) via a channel. In this illustration, the transmitter includes more antennas than the receiver and establishes beamforming coefficients by first determining the channel matrix (H) of the channel. This may be done in a variety of ways as already discussed. Once the channel matrix (H) is determined, the transmitter determines the beamforming coefficients based on the channel matrix (H) and a smoothness criteria. In one embodiment, the smoothness criteria is a measure to preserve coding distance of symbols and/or to obtain a desired peak to average ratio.

The transmitter using the beamforming coefficients to transmit frames to the receiver such that the transmit energy is in a focused pattern as shown. With a focused transmit energy, a 3 dB gain in comparison to omni directional transmit power can be achieved.

Figure 8:
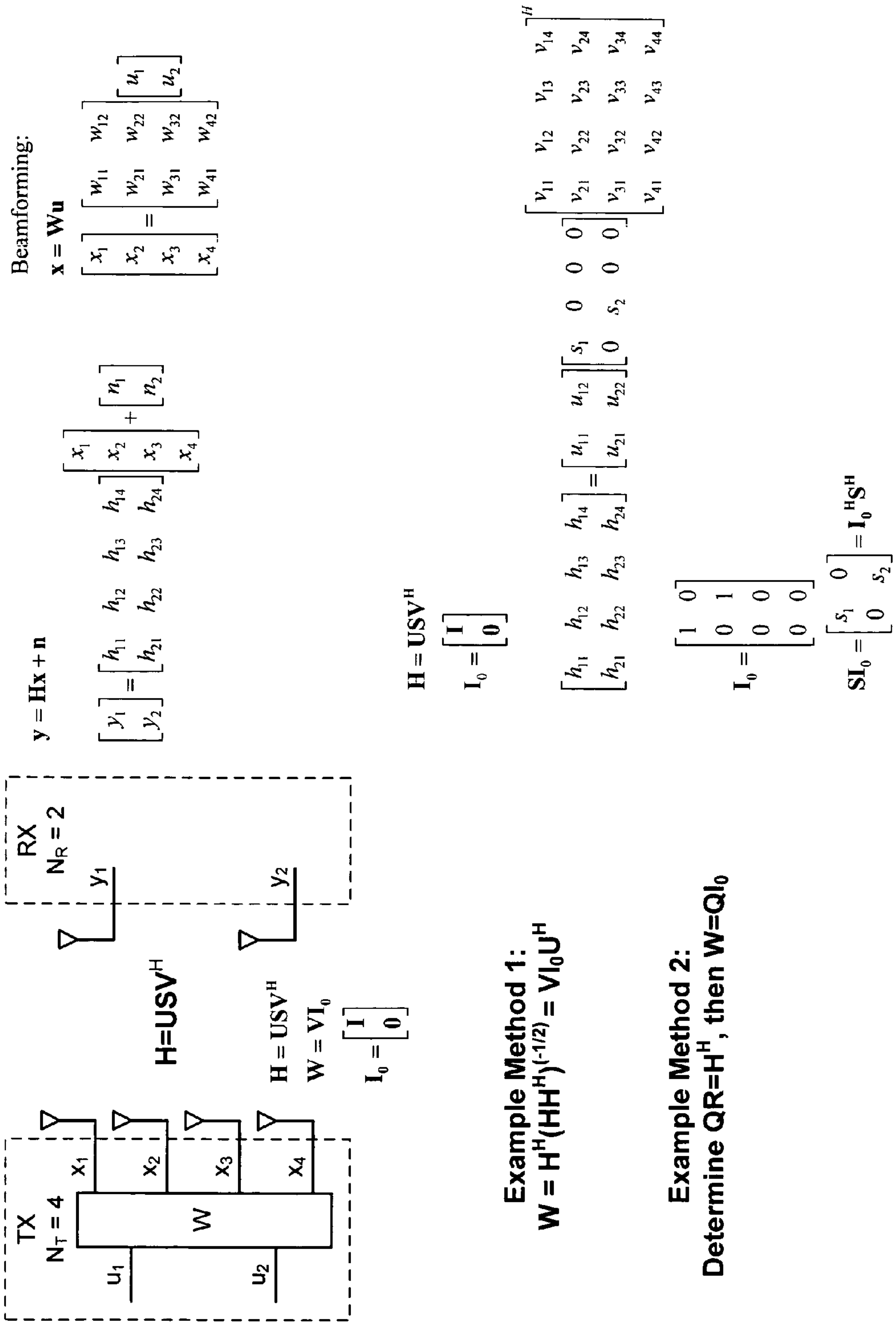
FIG. 8 is a diagram illustrating beamforming matrix determination in accordance with the present invention.

FIG. 8 is a diagram illustrating a 4×2 MIMO transmission using a beamforming matrix as determination in accordance with the present invention. In this example, the transmitter (TX) includes four antennas and the receiver (RX) includes two antennas. The channel matrix H may be determined as $H=USV^H$ as shown. Once H is obtained, the beamforming matrix (W) coefficients may be determined using a variety of methods. For example, the beamforming matrix (W) may be determined as $W=H^H(HH^H)^{(-1/2)}=VI_0U^H$, where V and $U^H$ are unitary matrix. The following is a proof that $H^H(HH^H)^{(-1/2)}=VI_0U^H$:

$$H^H(HH^H)^{-1/2} = VI_0U^H$$

$$\begin{aligned}
H^H(HH^H)^{-1/2} &= VS^HU^H(USV^HVS^HU^H)^{-1/2} \\
&= VS^HU^H(USS^HU^H)^{-1/2} \\
&= VS^HU^H(USI_0I_0S^HU^H)^{-1/2} \\
&= VS^HU^H(USI_0U^HUI_0^HS^HU^H)^{-1/2} \\
&= VS^HU^H(USI_0U^HUSI_0U^H)^{-1/2} \\
&= VS^HU^H((USI_0U^H)(USI_0U^H))^{-1/2} \\
&= VS^HU^H(USI_0U^H)^{-1} \\
&= VS^HU^HU(SI_0)^{-1}U^H \\
&= VS^H(SI_0)^{-1}U^H \\
&= VI_0U^H
\end{aligned}$$

As an alternative method for the beamforming matrix (W) may be determined as $W=QI_0$, where $QR=H^H$. As such, the transpose of the channel matrix (H) may be QR decomposes to obtain Q, where Q is a unitary matrix and R is a triangular matrix. Note that in each of the examples provided above the transpose of a matrix (e.g., $U^H$) is the Hermitian transpose of the matrix (e.g., U).

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "operably associated with", as may be used herein, includes direct and/or indirect coupling of separate components and/or one component being embedded within another component. As one of ordinary skill in the art will still further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a method and apparatus for determining beamforming coefficients with minimal code distance loss and PAR discrepancies. As one of ordinary skill in the art will appreciate, other embodiments may be derived from the teachings of the present invention without deviating from the scope of the claims.

What is claimed is:

1. A method for determining beamforming coefficients comprising:

obtaining channel information to determine a channel matrix H for a multiple tone communication;

generating a transpose matrix $H^H$ of the channel matrix H;

generating a transmit matrix W utilizing the channel matrix H and the transpose matrix $H^H$, in which the transmit matrix W is derived by calculating a relationship $W=H^H(HH^H)^{-1/2}$ and in which the transmit matrix W provides beamforming coefficients; and beamforming output streams using the beamforming coefficients prior to transmission of the output streams.

2. The method of claim 1, wherein generating the transmit matrix W instead utilizes a relationship $QR=H^H$, where Q is a unitary matrix and R is a triangular matrix, in which QR decomposition is utilized to obtain matrix Q and matrix Q is then utilized in a relationship $W=QI_0$, where $I_0$ is an identity matrix based on a number of transmit and receive antennas, to calculate the transmit matrix W.

3. A radio frequency transmitter comprising:

baseband processing module operably coupled to convert outbound data into outbound baseband signals, wherein the baseband processing module functions to:

encode the outbound data to produce encoded data;

interleave the encoded data into a plurality of interleaved streams of encoded data;

map the plurality of interleaved streams of encoded data into a plurality of streams of symbols;

obtain channel information to determine a channel matrix H for a multiple tone communication;

generate a transpose matrix $H^H$ of the channel matrix H;

generate a transmit matrix W utilizing the channel matrix H and the transpose matrix $H^H$, in which the transmit matrix W is derived by calculating a relationship $W=H^H(HH^H)^{-1/2}$ and in which the transmit matrix W provides beamforming coefficients;

beamform the plurality of streams of symbols based on the beamforming coefficients to produce a plurality of streams of beamformed symbols; and convert the plurality of streams of beamformed symbols from a frequency domain to a time domain to produce the outbound baseband signals; and radio frequency (RF) transmit section operably coupled to convert the outbound baseband signals into outbound RF signals.

4. The radio frequency transmitter of claim 3, wherein when the baseband processing module generates the transmit matrix W, the baseband processing module instead generates the transmit matrix W by utilizing a relationship $QR=H^H$, where Q is a unitary matrix and R is a triangular matrix, in which QR decomposition is utilized to obtain matrix Q and matrix Q is then utilized in a relationship $W=QI_0$, where $I_0$ is an identity matrix based on a number of transmit and receive antennas, to calculate the transmit matrix W.

5. A radio frequency transmitter baseband processor comprises:

an encoder operably coupled to encode outbound data to produce encoded data;

an interleaving module operably coupled to interleave the encoded data into a plurality of interleaved streams of encoded data;

mapping module operably coupled to map the plurality of interleaved streams of encoded data into a plurality of streams of symbols;

beamforming module operably coupled to:

obtain channel information to determine a channel matrix H for a multiple tone communication;

generate a transpose matrix $H^H$ of the channel matrix H;

generate a transmit matrix W utilizing the channel matrix H and the transpose matrix $H^H$, in which the transmit matrix W is derived by calculating a relationship $W=H(HH^H)^{-1/2}$ and in which the transmit matrix W provides beamforming coefficients; and beamform the plurality of streams of symbols based on the beamforming coefficients to produce a plurality of streams of beamformed symbols; and domain conversion module operably coupled to convert the plurality of streams of beamformed symbols from a frequency domain to a time domain to produce the outbound baseband signals.

6. The radio frequency transmitter baseband processor of claim 5, wherein when the beamforming module generates the transmit matrix W, the beamforming module instead generates the transmit matrix W by utilizing a relationship $QR=H^H$, where Q is a unitary matrix and R is a triangular matrix, in which QR decomposition is utilized to obtain matrix Q and matrix Q is then utilized in a relationship $W=QI_0$, where $I_0$ is an identity matrix based on a number of transmit and receive antennas, to calculate the transmit matrix W.

* * * * *

UNITED STATES PATENT AND TRADEMARK OFFICE

CERTIFICATE OF CORRECTION

PATENT NO. : 7,693,551 B2
APPLICATION NO. : 11/433329
DATED : April 6, 2010
INVENTOR(S) : Eric J. Ojard It is certified that error appears in the above-identified patent and that said Letters Patent is hereby corrected as shown below:

Col. 16, line 27, in claim 5: replace "$W=H(HH^H)^{-1/2}$" with --$W=H^H(HH^H)^{-1/2}$--

Signed and Sealed this
Fourteenth Day of August, 2012

David J. Kappos
*Director of the United States Patent and Trademark Office*